US010618637B2

(12) United States Patent
Pal

(10) Patent No.: US 10,618,637 B2
(45) Date of Patent: Apr. 14, 2020

(54) MOTOR DRIVEN COOLED COMPRESSOR SYSTEM

(71) Applicant: Hamilton Sundstrand Corporation, Charlotte, NC (US)

(72) Inventor: Debabrata Pal, Hoffman Estates, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 578 days.

(21) Appl. No.: 15/333,447

(22) Filed: Oct. 25, 2016

(65) Prior Publication Data

US 2018/0111676 A1   Apr. 26, 2018

(51) Int. Cl.
  *F04D 29/58* (2006.01)
  *F04C 29/04* (2006.01)
  *B64C 21/06* (2006.01)

(52) U.S. Cl.
  CPC .............. *B64C 21/06* (2013.01); *F04C 29/04* (2013.01); *F04D 29/5806* (2013.01); *F04C 2210/221* (2013.01); *F04C 2240/20* (2013.01); *F04C 2240/40* (2013.01)

(58) Field of Classification Search
  CPC .... F04D 29/5806; F04D 25/082; F04D 25/06; B64C 21/06
  USPC .................................................. 417/366, 371
  See application file for complete search history.

(56) References Cited

U.S. PATENT DOCUMENTS

| 6,129,524 A * | 10/2000 | Woollenweber ........ F04D 17/12 417/366 |
| 2006/0073030 A1* | 4/2006 | McAuliffe ............ F04D 25/082 417/366 |
| 2007/0018516 A1* | 1/2007 | Pal ........................ F04D 25/082 310/61 |
| 2009/0010771 A1* | 1/2009 | Vinson .................. F04D 25/082 417/366 |
| 2012/0011878 A1* | 1/2012 | Hipsky .................. B64D 13/06 62/401 |
| 2014/0030070 A1* | 1/2014 | Beers .................... F04D 25/082 415/170.1 |
| 2016/0075435 A1* | 3/2016 | Stieger .................... B64C 21/06 454/76 |

(Continued)

FOREIGN PATENT DOCUMENTS

| EP | 3015806 A1 | 5/2016 |
| EP | 3076526 A1 | 10/2016 |
| WO | 2005002025 A1 | 1/2005 |

*Primary Examiner* — Philip J Bonzell
*Assistant Examiner* — Tye William Abell
(74) *Attorney, Agent, or Firm* — Cantor Colburn LLP

(57) ABSTRACT

A cooled compressor system is provided including: a compressor that in operation compresses air; an electric motor that in operation drives the compressor, the electric motor having a back iron, a motor stator radially inward from the back iron, and a motor rotor radially inward from the motor stator; an airflow system fluidly connected to the compressor, the airflow system in operation directs air through the back iron and in between the motor stator and motor rotor; an airflow inlet that in operation allows an inflow of air to the airflow system; and an airflow outlet that in operation allows an outflow of air from the airflow system; wherein the air travels from the airflow inlet to the airflow outlet through the compressor and the airflow system.

20 Claims, 5 Drawing Sheets

(56) References Cited

U.S. PATENT DOCUMENTS

2016/0186777 A1* 6/2016 Colson .................... F04D 25/06
                                                                                            417/366
2017/0037858 A1* 2/2017 Back ...................... F04D 25/06

* cited by examiner

MOTOR DRIVEN COOLED COMPRESSOR SYSTEM

BACKGROUND

The subject matter disclosed herein generally relates to a compressors, and more specifically to an apparatus and a method for cooling a compressor system.

Engineers are continuously trying to reduce drag on aircraft and other vehicles. Viscous drag is the frictional force between the air and the aircraft surface that occurs primarily in the boundary layer. In a laminar flow boundary layer, the air molecules at the aircraft surface are effectively stationary and then the velocity of the air molecules gradually increases moving away from the aircraft surface. If the laminar flow breaks away from the aircraft surface, a turbulent boundary layer is created. A turbulent boundary layer tends to increase viscous drag in comparison to a laminar flow. Various methods of boundary-layer flow control have been incorporated into aircraft to help induce laminar flow on the aircraft surface and thus reduce drag. One method to control the boundary-layer is called boundary layer suction, which utilizes air compressors to provide suction at selected point on the aircraft surface. The compressors can be powered by compact high power electric motors. The compressors must be cooled and a lightweight efficient solution is desired.

BRIEF DESCRIPTION

According to one embodiment, a cooled compressor system is provided. The cooled compressor system including: a compressor that in operation compresses air; an electric motor that in operation drives the compressor, the electric motor having a back iron, a motor stator radially inward from the back iron, and a motor rotor radially inward from the motor stator; an airflow system fluidly connected to the compressor, the airflow system in operation directs air through the back iron and in between the motor stator and motor rotor; an airflow inlet that in operation allows an inflow of air to the airflow system; and an airflow outlet that in operation allows an outflow of air from the airflow system; wherein the air travels from the airflow inlet to the airflow outlet through the compressor and the airflow system.

In addition to one or more of the features described above, or as an alternative, further embodiments of the cooled compressor system may include that the airflow system is fluidly connected to the airflow inlet through the compressor.

In addition to one or more of the features described above, or as an alternative, further embodiments of the cooled compressor system may include that the compressor further includes a compressor inlet fluidly connected to the airflow inlet and a compressor outlet fluidly connected to the airflow system.

In addition to one or more of the features described above, or as an alternative, further embodiments of the cooled compressor system may include that the airflow system is fluidly connected to the airflow outlet through the compressor.

In addition to one or more of the features described above, or as an alternative, further embodiments of the cooled compressor system may include that the compressor further includes a compressor inlet fluidly connected to the airflow system and a compressor outlet fluidly connected to the airflow outlet.

In addition to one or more of the features described above, or as an alternative, further embodiments of the cooled compressor system may include that the airflow inlet is located on the outer surface of an aircraft, the airflow inlet being in fluid communication with air located outside of the aircraft.

In addition to one or more of the features described above, or as an alternative, further embodiments of the cooled compressor system may include that the airflow inlet is located on an engine nacelle of the aircraft.

According to another embodiment, a method of assembling a cooled compressor system. The method of assembling the cooled compressor system including: operably connecting an electric motor to a compressor that in operation compresses air when driven by the electric motor, the electric motor having a back iron, a motor stator radially inward from the back iron, and a motor rotor radially inward from the motor stator; fluidly connecting an airflow system to the compressor, the airflow system in operation directs air through the back iron and in between the motor stator and motor rotor; fluidly connecting an airflow inlet to at least one of the compressor and the airflow system, the airflow inlet in operation allows an inflow of air to the airflow system; and fluidly connecting an airflow outlet to at least one of the compressor and the airflow system, the airflow outlet in operation allows an outflow of air from the airflow system; wherein the air travels from the airflow inlet to the airflow outlet through the compressor and the airflow system.

In addition to one or more of the features described above, or as an alternative, further embodiments of the method of assembling a cooled compressor system may include that the airflow system is fluidly connected to the airflow inlet through the compressor.

In addition to one or more of the features described above, or as an alternative, further embodiments of the method of assembling a cooled compressor system may include that the compressor further includes a compressor inlet fluidly connected to the airflow inlet and a compressor outlet fluidly connected to the airflow system.

In addition to one or more of the features described above, or as an alternative, further embodiments of the method of assembling a cooled compressor system may include that the airflow system is fluidly connected to the airflow outlet through the compressor.

In addition to one or more of the features described above, or as an alternative, further embodiments of the method of assembling a cooled compressor system may include that the compressor further includes a compressor inlet fluidly connected to the airflow system and a compressor outlet fluidly connected to the airflow outlet.

In addition to one or more of the features described above, or as an alternative, further embodiments of the method of assembling a cooled compressor system may include installing the airflow inlet on the outer surface of an aircraft, the airflow inlet being in fluid communication with air located outside of the aircraft.

In addition to one or more of the features described above, or as an alternative, further embodiments of the method of assembling a cooled compressor system may include that the airflow inlet is located on an engine nacelle of the aircraft.

According to another embodiment, a method of operating a cooled compressor system is provided. The method of operating a cooled compressor system includes: powering an electric motor, the electric motor having a back iron, a motor stator radially inward from the back iron, and a motor rotor radially inward from the motor stator; driving a compressor using the electric motor; compressing air using the compressor; flowing air through the back iron and in between the motor stator and motor rotor using an airflow system fluidly connected to the compressor, the flowing air in operation cools the electric motor; allowing an inflow of air to the airflow system using an airflow inlet; and allowing an outflow of air from the airflow system using an airflow outlet; wherein the air travels from the airflow inlet to the airflow outlet through the compressor and the airflow system.

In addition to one or more of the features described above, or as an alternative, further embodiments of the method of operating a cooled compressor system may include that the airflow system is fluidly connected to the airflow inlet through the compressor.

In addition to one or more of the features described above, or as an alternative, further embodiments of the method of operating a cooled compressor system may include that the compressor further includes a compressor inlet fluidly connected to the airflow inlet and a compressor outlet fluidly connected to the airflow system.

In addition to one or more of the features described above, or as an alternative, further embodiments of the method of operating a cooled compressor system may include that the airflow system is fluidly connected to the airflow outlet through the compressor.

In addition to one or more of the features described above, or as an alternative, further embodiments of the method of operating a cooled compressor system may include that the compressor further includes a compressor inlet fluidly connected to the airflow system and a compressor outlet fluidly connected to the airflow outlet.

In addition to one or more of the features described above, or as an alternative, further embodiments of the method of operating a cooled compressor system may include that the airflow inlet is located on the outer surface of an aircraft, the airflow inlet being in fluid communication with air located outside of the aircraft.

Technical effects of embodiments of the present disclosure include utilizing compressor airflow to cool an electric motor driving the compressor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
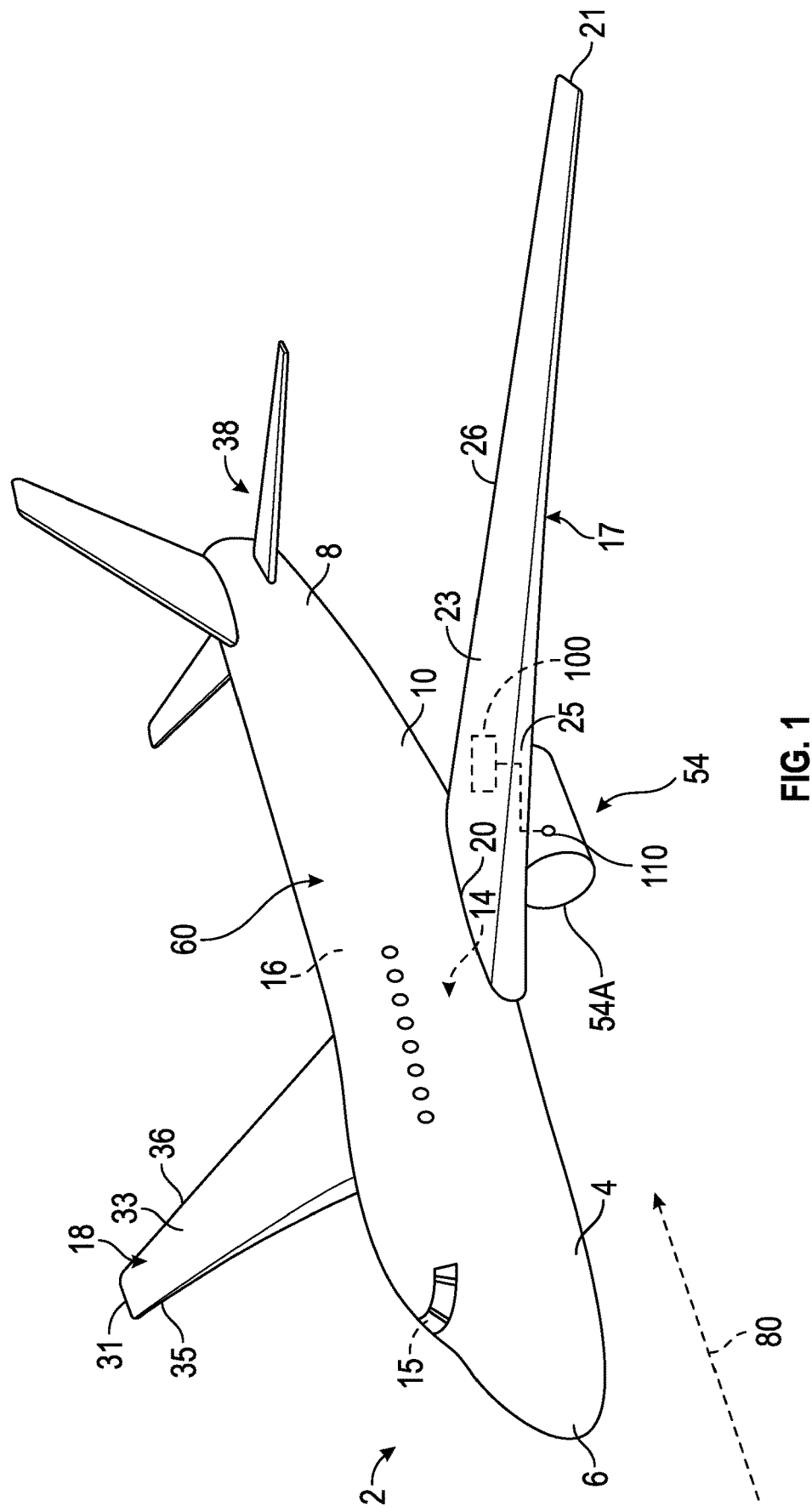
FIG. 1 is a perspective view of an aircraft that may incorporate embodiments of the present disclosure.

Referring now to FIG. 1, which shows a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 within an engine nacelle 54a configured to provide propulsion to the aircraft 2.

The aircraft 2 includes a cooled compressor system 100 to provide boundary layer suction that in operation decreases drag. The compressor may provide boundary layer suction to any outer surface 60 of the aircraft 2 including but not limited to the fuselage 4, the wings 17, 18, tail portion 8, and engine nacelle 54a. The compressor may be mounted in various locations of the aircraft 2 including but not limited to the fuselage 4, the wings 17, 18, tail portion 8, and engine nacelle 54a. In an embodiment, as seen in FIG. 1, the cooled compressor system 100 may be mounted within the wing 17 and may provide boundary layer suction for the outer surface 60 of the aircraft 2 at the nacelle 54a through an airflow inlet 110. The airflow inlet 110 is in fluid communication with air 80 located outside of the aircraft 2. The airflow inlet in operation allows air 80 to be pulled into the cooled compressor system 100 by a compressor 120 (see FIG. 2). The airflow inlet 110 may include at least one hole in the aircraft surface 60. Only one hole is displayed as the airflow inlet 110 in FIG.1 for simplicity; however, as may be appreciated by one of skill in the art, the airflow inlet 110 may include one or more holes of various shapes and sizes.

Figure 2:
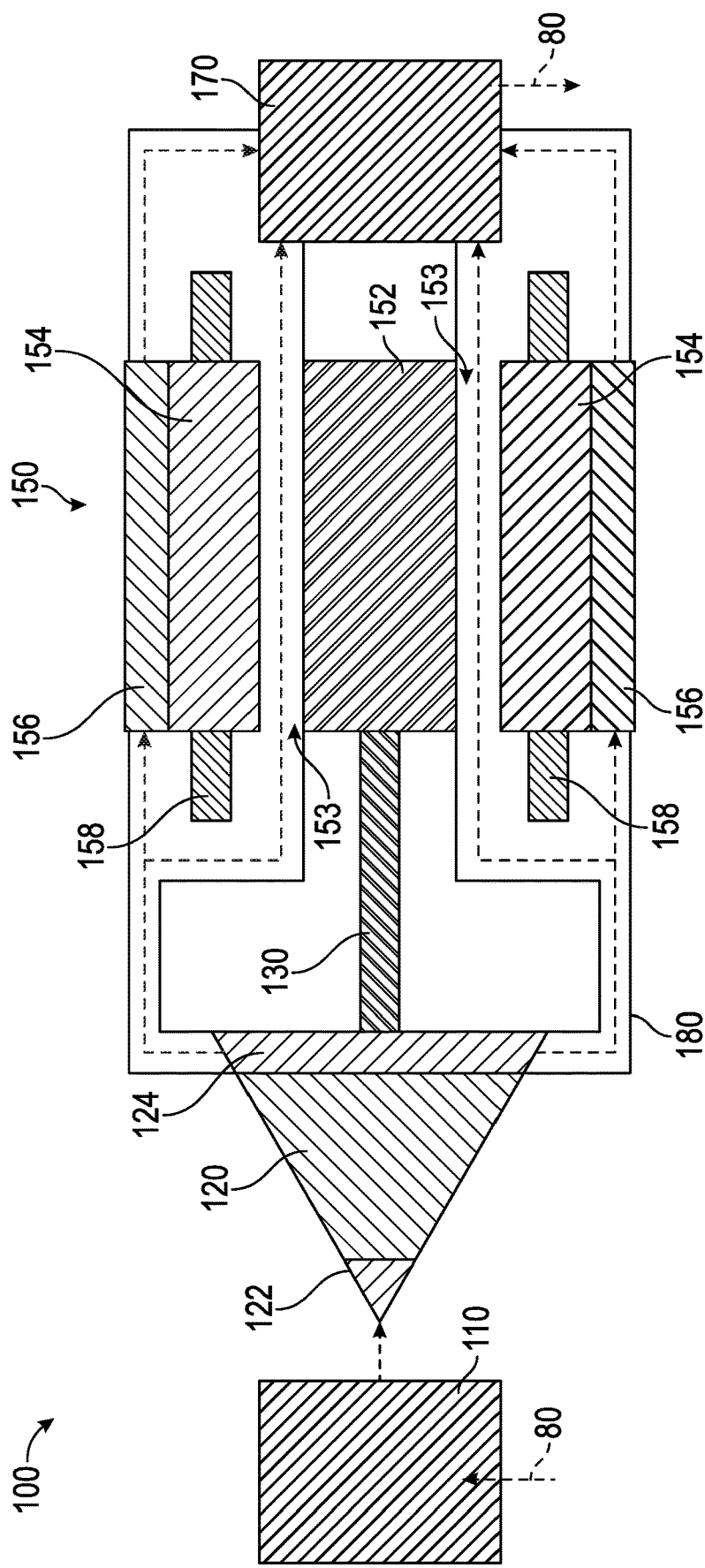
FIG. 2 is a cross-sectional view of a cooled compressor system, according to an embodiment of the present disclosure.
Figure 3:
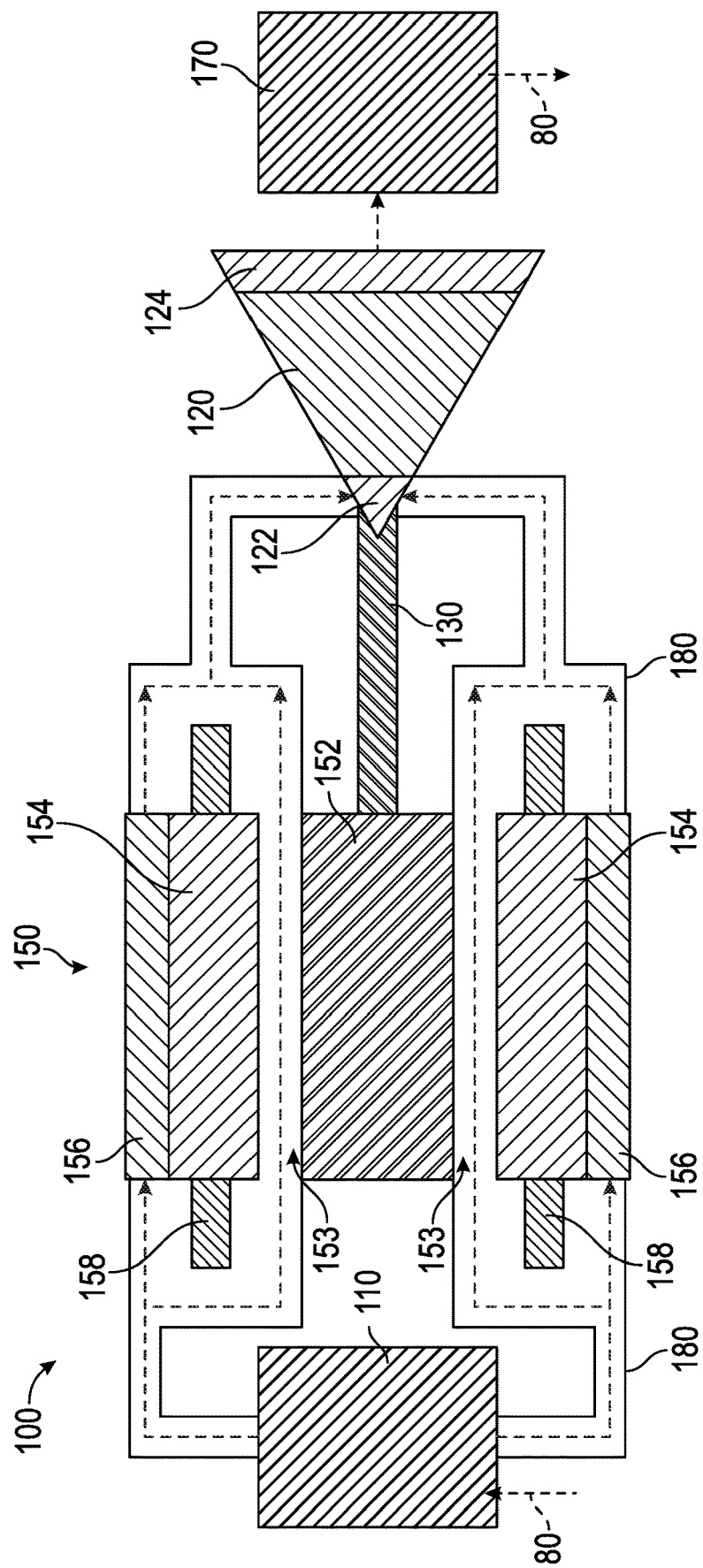
FIG. 3 is a cross-sectional view of a cooled compressor system, according to an embodiment of the present disclosure.

Referring now to FIGS. 2-3, a cooled compressor system 100 is illustrated. FIG. 2 displays one embodiment of the cooled compressor system 100 and FIG. 3 displays another embodiment of the cooled compressor system 100. The cooled compressor system 100 can be used to provide boundary layer suction while cooling itself using that same air 80 being compressed. As seen in FIG. 2-3, the cooled compressor system 100 comprises a compressor 120, an electric motor 150, an airflow system 180, an airflow inlet 110, and an airflow outlet 170. The compressor 120 includes a compressor inlet 122 and a compressor outlet 124. Air 80 is pulled into the compress 120 at the compressor inlet 122, compressed by the compressor 120 and then expelled from the compressor 120 at the compressor outlet 124. The compressor 120 in operation compresses air 80 that has entered the cooled compressor system 100 through the airflow inlet 110. The electric motor 150 is operably connected to the compressor 120. The electric motor 150 may be operably connected to the compressor 120 through a drive shaft 130, as seen in FIGS. 2-3. The electric motor 150 in operation drives the compressor 120, thus allowing the compressor 120 to compress air 80. The electric motor 150 comprises a back iron 156, a motor stator 154 radially inward from the back iron 156, and a motor rotor 152 radially inward from the motor stator 154. A gap 153 exists between the motor stator 154 and the motor rotor 152.

The airflow system 180 in operation directs air through the back iron 156 and in between the motor stator 154 and motor rotor 152 (i.e. through the gap 153). The airflow system 180 is thermally connected to the back iron 156, the motor stator 154, and motor rotor 152, thus as air flows through the airflow system 180, heat is removed from the back iron 156, the motor stator 154, and motor rotor 152. The back iron 156 may have cooling channels and/or cooling fins to enhance transfer of heat from the back iron 156 to the cooling flow of air 80. The flow of air 80 can also pass over the end windings 158 of the motor stator 154 to provide additional cooling to the motor stator 154. The airflow system 180 may be a series of fluidly connected pipes and/or channels to direct the flow of air 80 as previously described. The airflow system 180 is fluidly connected to the compressor 120. The airflow inlet 110 in operation allows an inflow of air 80 to the airflow system 180. As mentioned above the air may come from outside the aircraft 2 of FIG. 1. The airflow outlet 170 in operation allows an outflow of air 80 from the airflow system 180. The airflow outlet 170 may allow the air 80 to be expelled outside the aircraft 2 of FIG. 1. The air 80 travels from the airflow inlet 110 to the airflow outlet 170 through the compressor 120 and the airflow system 180, thus the same air 80 that passes through the compressor 120 also passes through the airflow system 180.

The air 80 may be compressed by the compressor 120 first and then flow through the airflow system 180 or the air 80 may flow through the airflow system 180 first and then get compressed by the compressor 120. In an embodiment, as seen in the example of FIG. 2, the airflow system 180 is fluidly connected to the airflow inlet 110 through the compressor 120. In the example of FIG. 2, the compressor inlet 122 may be fluidly connected to the airflow inlet 110 and the compressor outlet 124 may be fluidly connected to the airflow system 180. In another embodiment, as seen in the example FIG. 3, the airflow system 180 is fluidly connected to the airflow outlet 170 through the compressor 120. In the example of FIG. 3, the compressor inlet 122 may be fluidly connected to the airflow system 180 and the compressor outlet 124 may be fluidly connected to the airflow outlet 170.

Advantageously, the efficient design of the cooled compressor system 100 in the present disclosure allows for sufficient cooling of the electric motor 150 while eliminating the need for complex ducting to provide air from a source other than the cooled compressor system 100. Advantageously, increased cooling capacity may result by pulling the air 80 through the airflow system 180 first and then compressing the air 80, as seen in FIG. 3, due to the potential temperature increase that is a byproduct of the compression process.

Figure 4:
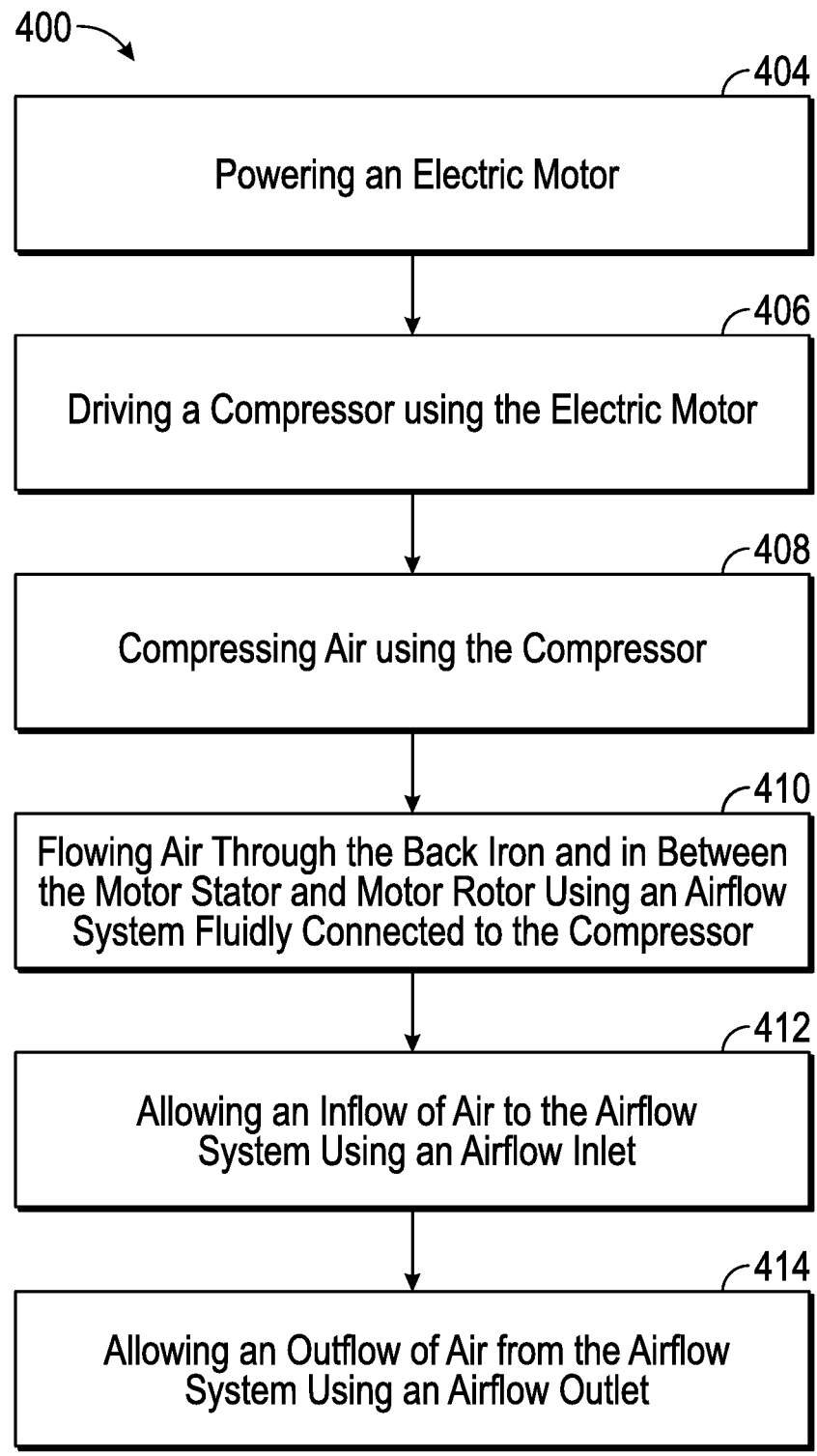
FIG. 4 is a flow process illustrating a method of operating the cooled compressor system of FIGS. 1-3, according to an embodiment of the present disclosure.

Referring now to FIG. 4, while referencing components of the cooled compressor system 100 of FIGS. 1-3, FIG. 4 shows a flow process illustrating a method 400 of operating the cooled compressor system 100 of FIGS. 1-3, according to an embodiment of the present disclosure.

At block 404, the electric motor 150 is powered. As mentioned above, the electric motor 150 comprises a back iron 156, a motor stator 154 radially inward from the back iron 156, and a motor rotor 152 radially inward from the motor stator 154. A gap 153 exists between the motor stator 154 and the motor rotor 152. At block 406, the electric motor 150 drives the compressor 120, which allows the compressor 120 to compress air 80 at block 408. At block 410, the air 80 is flowed through the back iron and in between the motor stator 154 and motor rotor 152 using the airflow system 180 that is fluidly connected to the compressor 120. The flowing air 80 in operation cools the electric motor 150 by absorbing heat from the electric motor 150. At block 412, the airflow inlet 110 allows an inflow of air 80 to the airflow system 180. As mentioned above, the inflow of air 80 may be pulled from air 80 external to an aircraft 2. At block 414, the airflow outlet 170 allows an outflow of air 80 from the airflow system 180. As mentioned above, the outflow of air 80 may lead expel air from the aircraft 2.

While the above description has described the flow process of FIG. 4 in a particular order, it should be appreciated that unless otherwise specifically required in the attached claims that the ordering of the steps may be varied.

Figure 5:
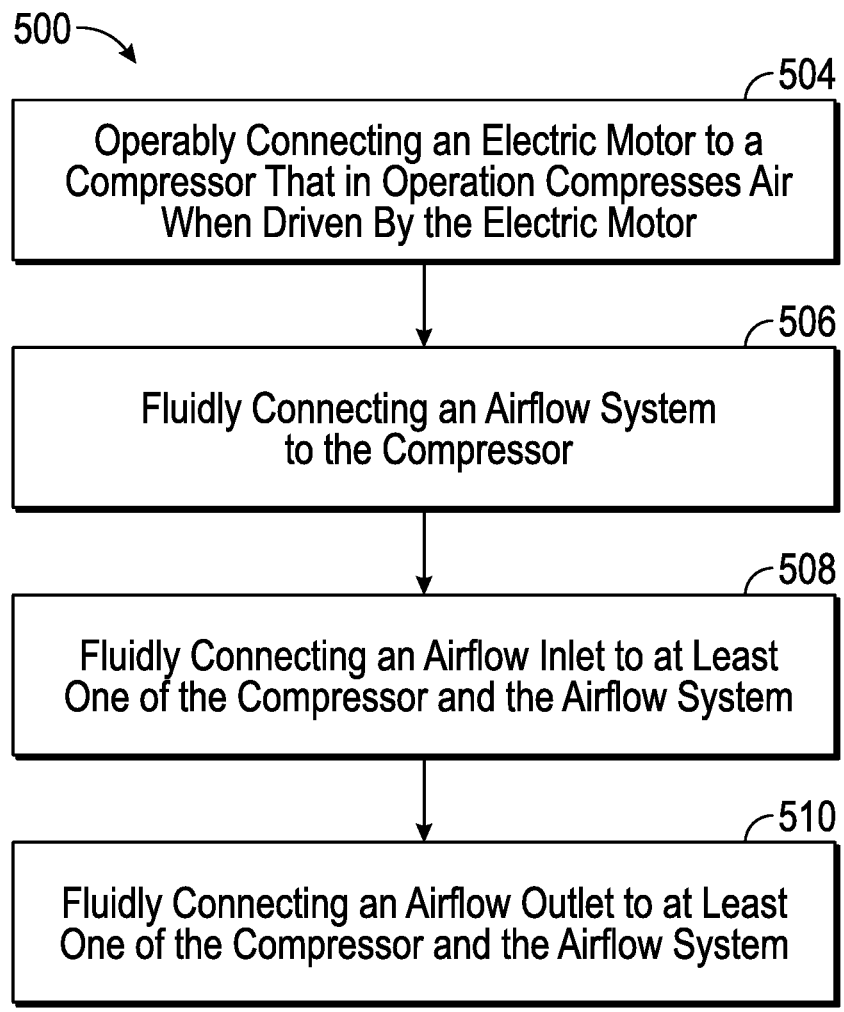
FIG. 5 is a flow process illustrating a method of assembling the cooled compressor system of FIGS. 1-3, according to an embodiment of the present disclosure.

Referring now to FIG. 5, while referencing components of the cooled compressor system 100 of FIGS. 1-3, FIG. 5 shows a flow process illustrating a method 500 of assembling the cooled compressor system 100 of FIGS. 1-3, according to an embodiment of the present disclosure.

At block 504, the electric motor 150 is operably connected to the compressor 120. As mentioned above, the compressor 120 in operation compresses air 80 when driven by the electric motor 150. As also mentioned above, the electric motor 150 includes a back iron 156, a motor stator 154 radially inward from the back iron 156, and a motor rotor 152 radially inward from the motor stator 154. At block 506, the airflow system 180 is fluidly connected to the compressor 120. The airflow system 180 in operation directs air 80 through the back iron 156 and in between the motor stator 154 and motor rotor 152. At block 508, the airflow inlet 110 is fluidly connected to at least one of the compressor 120 and the airflow system 180. In the example of FIG. 2, the airflow system 180 is fluidly connected to the airflow inlet 110 through the compressor 120. Whereas, in the example of FIG. 3, the airflow inlet 110 is fluidly connected to the airflow system 180. The airflow inlet 110 in operation allows an inflow of air 80 to the airflow system 180 to subsequently cool the electric motor 150.

At block 510, the airflow outlet 170 is fluidly connected to at least one of the compressor 120 and the airflow system 180. In the example of FIG. 3, the airflow system 180 is fluidly connected to the airflow outlet 170 through the compressor 120. Whereas, in the example of FIG. 2, the airflow outlet 170 is fluidly connected to airflow system 180. As mentioned above, the air 80 travels from the airflow inlet 110 to the airflow outlet 170 through both the compressor 120 and the airflow system 180. The method 500 may also include, installing the airflow inlet 110 on the outer surface 60 of an aircraft 2. As mentioned above, on the outer surface 60 of the aircraft 2 the airflow inlet 110 would be in fluid communication with air 80 located outside of the aircraft 2.

While the above description has described the flow process of FIG. 5 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cooled compressor system comprising:
    a compressor that in operation compresses air;
    an electric motor that in operation drives the compressor, the electric motor having a back iron, a motor stator radially inward from the back iron, and a motor rotor radially inward from the motor stator;
    an airflow system fluidly connected to the compressor, the airflow system in operation directs air through the back iron and in between the motor stator and motor rotor;
    an airflow inlet that in operation allows an inflow of air to the airflow system; and
    an airflow outlet that in operation allows an outflow of air from the airflow system;
    wherein the air travels from the airflow inlet to the airflow outlet through the compressor and the airflow system, and
    wherein the air is compressed by the compressor first and then flows through the airflow system or the air flows through the airflow system first and then gets compressed by the compressor.

2. The cooled compressor system of claim 1, wherein: the airflow system is fluidly connected to the airflow inlet through the compressor.

3. The cooled compressor system of claim 2, wherein: the compressor further includes a compressor inlet fluidly connected to the airflow inlet and a compressor outlet fluidly connected to the airflow system.

4. The cooled compressor system of claim 1, wherein: the airflow system is fluidly connected to the airflow outlet through the compressor.

5. The cooled compressor system of claim 4, wherein: the compressor further includes a compressor inlet fluidly connected to the airflow system and a compressor outlet fluidly connected to the airflow outlet.

6. The cooled compressor system of claim 1, wherein: the airflow inlet is located on an outer surface of an aircraft, the airflow inlet being in fluid communication with air located outside of the aircraft.

7. The cooled compressor system of claim 6, wherein: the airflow inlet is located on an engine nacelle of the aircraft.

8. A method of assembling a cooled compressor system comprising:
    operably connecting an electric motor to a compressor that in operation compresses air when driven by the electric motor, the electric motor having a back iron, a motor stator radially inward from the back iron, and a motor rotor radially inward from the motor stator;
    fluidly connecting an airflow system to the compressor, the airflow system in operation directs air through the back iron and in between the motor stator and motor rotor;
    fluidly connecting an airflow inlet to at least one of the compressor and the airflow system, the airflow inlet in operation allows an inflow of air to the airflow system; and
    fluidly connecting an airflow outlet to at least one of the compressor and the airflow system, the airflow outlet in operation allows an outflow of air from the airflow system;
    wherein the air travels from the airflow inlet to the airflow outlet through the compressor and the airflow system, and
    wherein the air is compressed by the compressor first and then flows through the airflow system or the air flows through the airflow system first and then gets compressed by the compressor.

9. The method of claim 8, wherein:
the airflow system is fluidly connected to the airflow inlet through the compressor.

10. The method of claim 9, wherein:
the compressor further includes a compressor inlet fluidly connected to the airflow inlet and a compressor outlet fluidly connected to the airflow system.

11. The method of claim 8, wherein:
the airflow system is fluidly connected to the airflow outlet through the compressor.

12. The method of claim 11, wherein:
the compressor further includes a compressor inlet fluidly connected to the airflow system and a compressor outlet fluidly connected to the airflow outlet.

13. The method of claim 8, further comprising:
installing the airflow inlet on an outer surface of an aircraft, the airflow inlet being in fluid communication with air located outside of the aircraft.

14. The method of claim 13, wherein:
the airflow inlet is located on an engine nacelle of the aircraft.

15. A method of operating a cooled compressor system comprising:
    powering an electric motor, the electric motor having a back iron, a motor stator radially inward from the back iron, and a motor rotor radially inward from the motor stator;
    driving a compressor using the electric motor;
    compressing air using the compressor;
    flowing air through the back iron and in between the motor stator and motor rotor using an airflow system fluidly connected to the compressor, the flowing air in operation cools the electric motor;
    allowing an inflow of air to the airflow system using an airflow inlet; and
    allowing an outflow of air from the airflow system using an airflow outlet;

wherein the air travels from the airflow inlet to the airflow outlet through the compressor and the airflow system, and wherein the air is compressed by the compressor first and then flows through the airflow system or the air flows through the airflow system first and then gets compressed by the compressor.

16. The method of claim 15, wherein:

the airflow inlet is located on an outer surface of an aircraft, the airflow inlet being in fluid communication with air located outside of the aircraft.

17. The method of claim 15, wherein:

the airflow system is fluidly connected to the airflow inlet through the compressor.

18. The method of claim 17, wherein:

the compressor further includes a compressor inlet fluidly connected to the airflow inlet and a compressor outlet fluidly connected to the airflow system.

19. The method of claim 15, wherein:

the airflow system is fluidly connected to the airflow outlet through the compressor.

20. The method of claim 19, wherein:

the compressor further includes a compressor inlet fluidly connected to the airflow system and a compressor outlet fluidly connected to the airflow outlet.

* * * * *